United States Patent
Fano et al.

(10) Patent No.: US 8,650,143 B2
(45) Date of Patent: Feb. 11, 2014

(54) DETERMINATION OF DOCUMENT CREDIBILITY

(75) Inventors: Andrew E. Fano, Lincolnshire, IL (US); Chad Cumby, Chicago, IL (US); Marko Krema, Evanston, IL (US); Sai P. Kandallu, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 289 days.

(21) Appl. No.: 13/221,592

(22) Filed: Aug. 30, 2011

(65) Prior Publication Data

US 2013/0054502 A1    Feb. 28, 2013

(51) Int. Cl.
*G06F 17/00*     (2006.01)
*G06N 5/02*      (2006.01)

(52) U.S. Cl.
USPC ......................................................... 706/46

(58) Field of Classification Search
None
See application file for complete search history.

(56) References Cited

U.S. PATENT DOCUMENTS

| | | | |
|---|---|---|---|
| 7,430,552 B2 | 9/2008 | Cameron et al. | |
| 2007/0143279 A1 | 6/2007 | Yao et al. | |
| 2009/0157490 A1 | 6/2009 | Lawyer | |
| 2009/0319542 A1 | 12/2009 | Le Brazidec et al. | |
| 2010/0262454 A1* | 10/2010 | Sommer et al. | 705/10 |
| 2010/0312792 A1 | 12/2010 | Ando et al. | |
| 2011/0029513 A1* | 2/2011 | Morris | 707/728 |

OTHER PUBLICATIONS

Mei et al. ("Topic Sentiment Mixture: Modeling Facets and Opinions in Weblogs", WWW 2007, pp. 10.*
Mei et al., "Topic Sentiment Mixture: Modeling Facets and Opinions in Weblogs", May 8-12, 2007, pp. 171-180.
Lin et al., "Joint Sentiment/Topic Model for Sentiment Analysis", CIKM' 09, Nov. 2-6, 2009, pp. 375-384.

* cited by examiner

*Primary Examiner* — Li-Wu Chang
(74) *Attorney, Agent, or Firm* — Harrity & Harrity, LLP (57) ABSTRACT

A plurality of topics encompassed in a document are determined and, for each such topic, a sentiment for that topic is likewise determined. Thereafter, credibility of the document is determined based on the resulting plurality of sentiments. In one embodiment, credibility of at least one target document is established by first determining, for each of a plurality of portions of the at least one target document, at least one topic encompassed in the portion to provide a plurality of target topics. Likewise, sentiment scores are determined for each portion. Thereafter, for each prior topic of a plurality of prior topics, a topic-sentiment score is determined based on sentiment scores corresponding to those portions of the plurality of portions having a target topic corresponding to the prior topic. A credibility index is determined based on the resulting plurality of topic-sentiment scores.

28 Claims, 6 Drawing Sheets

DETERMINATION OF DOCUMENT CREDIBILITY

FIELD

The instant disclosure relates generally to the automated analysis of text and, in particular, to the determination of credibility of one or more documents.

BACKGROUND

Generally, "credibility" is defined as the quality, capability or power to elicit belief or trust. To the extent that credibility is thus necessarily dependent upon the subjective determinations of others, the process of determining the credibility of someone or something (referred to hereinafter as an entity) is likewise often an highly subjective process. Additionally, the effort required to accurately assess credibility is typically significant to the extent that it requires gathering data from a relatively large number of people knowledgeable about the entity in question.

The relatively recent development of the Internet and World Wide Web has lead to a commensurate explosion in the availability of textual documents authored by entities of every conceivable type. Given the ubiquity and relative ease of accessing such text, interest in techniques (which techniques typically fall within the general categories of natural language processing and/or machine learning) for automatically processing documents in order to "understand" what information they may expressly or inherently convey has increased. Only recently have developers of such techniques turned to the task of assessing credibility of a document. As used herein, a document may comprise a distinct, uniquely identified collection of text, such as a word processing document, advertising copy, a web page, a web log entry, etc. or portions thereof.

For example, techniques have been developed for assessing the credibility of a document in which the importance or credibility of a document is determined based at least in part upon the credibility of its source, e.g., its author or publisher. Obviously, for such techniques to work, data concerning the reliability of the source must be available or, at the very least, readily obtainable, which may not always be the case. Additionally, given the myriad influences that go into the development of a source's reputation for credibility, it is not unreasonable to assume that a source's credibility won't always correlate precisely with the credibility of the document.

In another technique, the credibility of a topic or concept over time is determined by comparing the frequency with which an expression of that topic or concept is detected in a corpus of documents against the frequency with which a related expression of that topic or concept (e.g., a negative or inverse expression of the topic or concept in question) is detected in the documents. The intuition in this technique is that the frequency with which a concept is repeated may serve as a form of proxy for its credibility. For example, over time, the expression "global warming is real" may occur with increasing frequency as compared to the related expression "global warming is a hoax," with the resulting inference that the concept of "global warming is real" is becoming increasingly credible. However, this technique may likewise suffer from accuracy problems to the extent that text, particularly in the context of the Internet and/or World Wide Web, is often reproduced for reasons other than a subjective belief or trust in its semantic content. As a result, the frequency numbers could be easily skewed, thus resulting in an equally skewed credibility determination.

SUMMARY

The instant disclosure describes techniques for determining the credibility of a document based on sentiments corresponding to topics encompassed in the document. In an embodiment, a plurality of topics encompassed in a document are determined and, for each such topic, a sentiment for that topic is likewise determined. Thereafter, credibility of the document is determined based on the resulting plurality of sentiments. For example, the credibility may be based on a combination of the plurality of sentiments, such as an average where the sentiments are expressed as numerical scores. Based on the credibility thus determined, the document may be revised. Topic and sentiment determinations may be performed using respective topic and sentiment models. Additionally, information regarding any of the plurality of topics, the plurality of sentiments or the credibility of the document may be displayed. Because credibility is determined based on sentiments corresponding to topics described in the document itself, the accuracy of the credibility determination may be improved.

In an embodiment, credibility of at least one target document is established by first determining, for each of a plurality of portions of the at least one target document, at least one topic encompassed in the portion to provide a plurality of target topics. Likewise, sentiment scores are determined for each portion. In an embodiment, each portion may comprise an individual sentence within the at least one target document. Thereafter, for each prior topic of a plurality of prior topics, a topic-sentiment score is determined based on sentiment scores corresponding to those portions of the plurality of portions having a target topic corresponding to the prior topic. A credibility index is determined based on the resulting plurality of topic-sentiment scores. In an embodiment, the plurality of prior topics and corresponding prior topic scores may be determined based on analysis of prior documents. In this case, the determination of the credibility index may be carried out as a weighted average of the topic-sentiment scores in which ones of the prior topic scores are used as the weights. Related apparatus are likewise disclosed. Using the techniques described herein, the accuracy of the credibility techniques may be improved in that the credibility determination is focused on the topics found in the document to be analyzed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
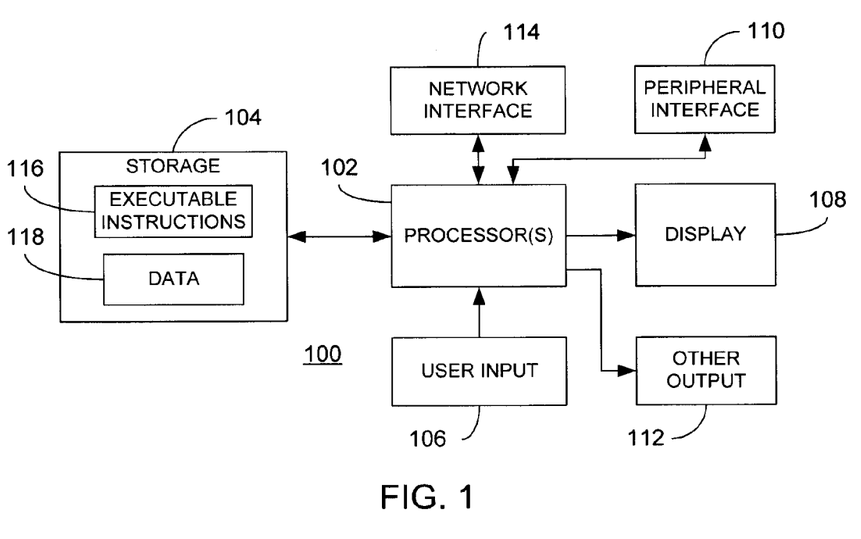
FIG. 1 is a block diagram of a processing device that may be used to implement various embodiments described herein.

FIG. 1 illustrates a representative processing device 100 that may be used to implement the teachings of the instant disclosure. The device 100 may be used to implement, for example, one or more components of the apparatus 200, 400 as described in greater detail below. Regardless, the device 100 comprises a processor 102 coupled to a storage component 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. The user input device 106 may comprise any mechanism for providing user input (such as, but not limited to, user inputs for selecting topic-sentiment scores, sentiment scores used to determine a topic-sentiment score, etc. as described below) to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
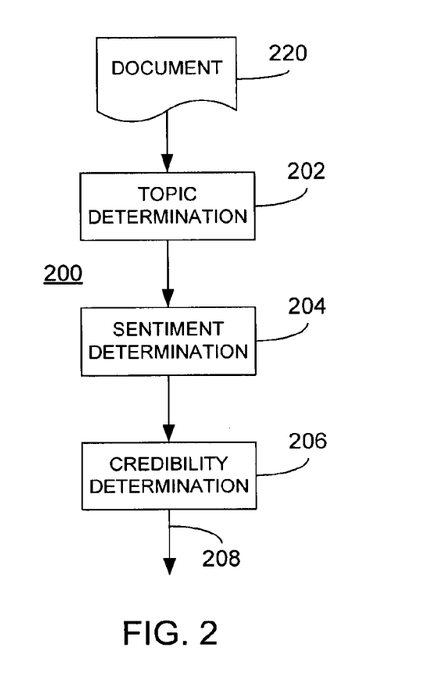
FIG. 2 is a block diagram of an apparatus for determining credibility of a document in accordance with an embodiment described herein.

Referring now to FIG. 2, an embodiment of an apparatus 200 for determining credibility of a document is illustrated. As noted above, the various components 202-206 forming the apparatus 200 may be implemented by the processing device 100 using executable instructions 116 to implement the functionality described herein. Of course, as further noted above, some or all of the apparatus 200 may also be implemented using firmware and/or hardware devices as a matter of design choice. As shown, the apparatus 200 comprises a topic determination component 202 operatively connected to a sentiment determination component 204 that, in turn, is operatively connected to a credibility determination component 208 that provides, as output, a credibility determination 208 of a document 220. As noted previously, the document 220 may comprise text in any of number of formats and representations; the instant disclosure is not limited in this regard. Furthermore, although a single document is illustrated in FIG. 2, those having ordinary skill in the art will appreciate that the apparatus 200 may be equally applied to a plurality of documents.

Regardless, the topic determination component 202 analyzes the document 220 to identify one or more topics therein. In particular, the topic determination component 202 may implement any of a number of well-known generative modeling techniques, such as latent Dirchlet allocation (LDA), probabilistic latent semantic analysis (PLSA) or various extensions thereof, to generate one or more topic models. Using such topic models, it is possible to discover or determine the existence of one or more topics in a given document and, furthermore, assign a score to a given topic, i.e., a probabilistic assessment that the document encompasses that specific topic. As used herein, a topic is a set of semantically coherent words or phrases within one or more documents. The resulting plurality of topics thus determined by the topic determination component 202 may then be provided to the sentiment determination component 204, as shown.

The sentiment determination component 204 determines sentiments for each of the plurality of topics to provide a plurality of sentiments. As used herein, a sentiment may be a set of words or phrases representing an opinion about a topic. To this end, the sentiment determination component 204 may apply any of a number of well-known sentiment analysis techniques to those portions of the document corresponding to a specific topic. For example, an overall sentiment for a given document may be determined and then applied to each of the topics identified therein. A more granular approach may be employed in which those portions of a document containing words especially related to a given topic are analyzed for a corresponding sentiment. For example, lists of words attributable to specific sentiments (e.g., "bad", "horrible", "pathetic" for a negative sentiment; "O.K.", "adequate", "indifferent" to a neutral sentiment; and "great", "pleased", "wonderful" for a positive sentiment) may be maintained and used to score the sentiment for the topic-specific portions as noted above.

The credibility determination component 206 operates to determine the credibility 208 of the document 220 based on the plurality of sentiments provided by the sentiment determination component 204. In an embodiment, this may be accomplished by combining the various sentiments determined for each of the detected topics in some fashion. For example, in one embodiment, the credibility of the document may be provided as the average of the sentiment scores across at least some of the detected topics, assuming in this case numerical sentiment scores. Other techniques for determining credibility based on the topics and corresponding sentiments may equally employed, e.g., a weighted average, selection of the median sentiment score, discarding outlier scores prior to averaging, etc. In this way, the effect of the document to inspire belief or trust is modeled according to the sentiments attributable to the various topics contained within the document itself, rather than an extrinsic stand-in factor, such as the source of the document.

In an alternative embodiment, the tasks of determining the plurality of topics and corresponding plurality of sentiments may be combined into a single component implementing a joint topic-sentiment determination technique. Various joint topic-sentiment modeling techniques based on the LDA and PLSA generative modeling techniques may be employed for this purpose. For example, an extension of PLSA may be found in Mei et al., "Topic Sentiment Mixture: Modeling Facets and Opinions in Weblogs", Proceedings of the 16th International Conference on World Wide Web (WWW 2007), p. 171-189, the teachings of which are incorporated herein by this reference. As another example of a suitable extension, in this case, of the LDA technique is described by C. Lin and Y. He, "Joint sentiment/topic model for sentiment analysis", Proceedings of the ACM international conference on Information and knowledge management (CIKM) 2009, the teachings of which are incorporated herein by this reference. Using such techniques, topic discovery is performed simultaneously with sentiment determinations for the discovered topics. Regardless, the resulting topic and sentiments determinations may then be used to determine the credibility of the document as noted above.

Figure 3:
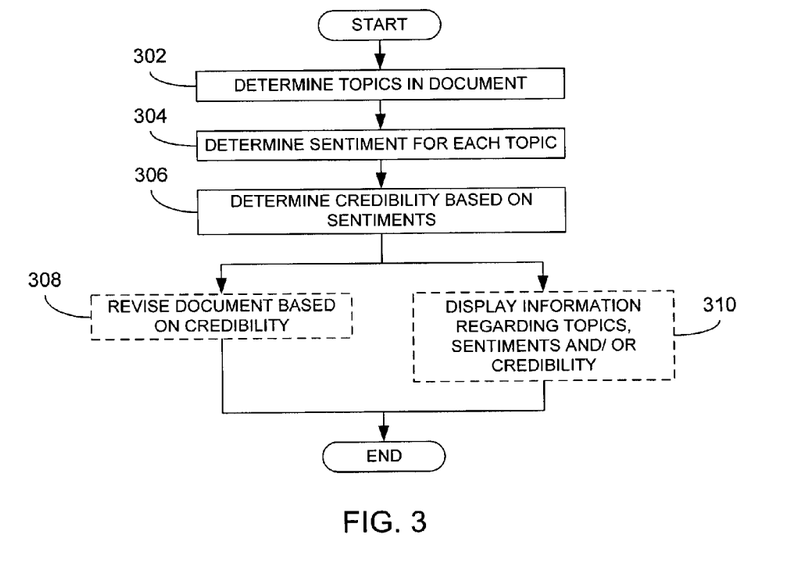
FIG. 3 is a flow chart illustrating processing for determining credibility of a document in accordance with the embodiment of FIG. 1.

Referring now to FIG. 3, a flowchart illustrating the processing implemented by the apparatus 200 is provided. Thus, beginning at block 302, a plurality of topics are detected within a document and, at block 304, a sentiment for each topic is likewise determined. Thereafter, at block 306, a credibility of the document is determined based on the plurality of sentiments. In an embodiment, the document being analyzed may comprise a proposed communication by an entity. For example, a company may be proposing to issue a press release about its most recent addition to its product lineup. By first assessing the credibility of the proposed communication in accordance with the instant techniques, the potential need for changes to improve its credibility may be determined. This is optionally illustrated at block 308 where revisions to the document (i.e., the proposed communication) are made based on the credibility determination. In an embodiment described below, it is possible to identify specific portions of a proposed communication affecting the credibility determination one way or another. By eliminating or enhancing the relevant portions of the document, the perceived credibility of the document may be improved.

As a further optional step, illustrated at block 310, information regarding any of the plurality of topics, the plurality of corresponding sentiments and/or the resulting credibility may be displayed to a user. For example, and with reference to FIG. 1, such information could be displayed via the display 108. Thus, in an embodiment, key words describing each of the identified topics could be displayed. Likewise, scores for each of the topic and/or corresponding sentiments or, further still, the determined credibility could also be displayed. More detailed examples of a suitable graphical user interface for this purpose are further described below relative to FIGS. 6-8.

Figure 4:
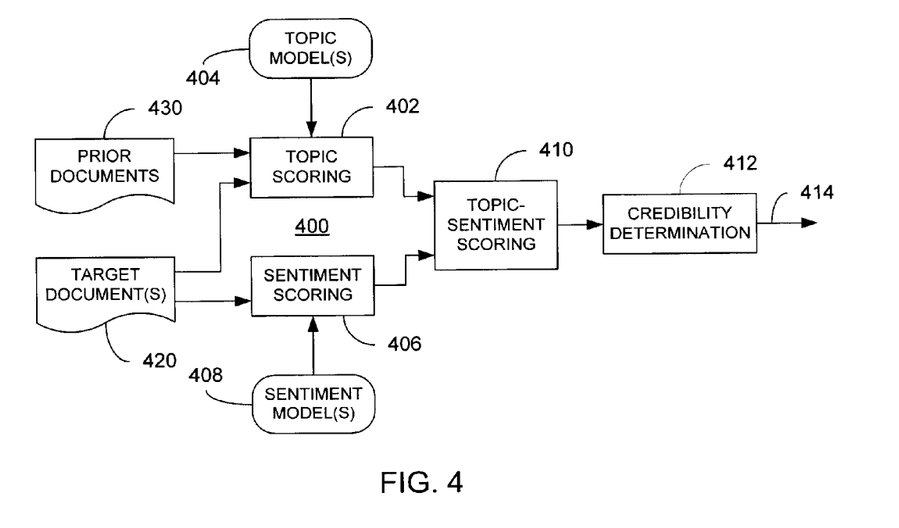
FIG. 4 is a block diagram of an apparatus for determining credibility of a document in accordance with an alternative embodiment described herein.

Referring now to FIG. 4, an embodiment of an alternative apparatus 400 in accordance with the instant disclosure is described. As noted above, the various components 402-408 forming the apparatus 400 may be implemented by the processing device 100 using executable instructions 116 to implement the functionality described herein. Of course, as further noted above, some or all of the apparatus 400 may also be implemented using firmware and/or hardware devices as a matter of design choice. The implementation illustrated in FIG. 4 (the operation of which is further described with reference to FIG. 5) is particularly suitable for assessing the credibility of an entity (e.g., a product and/or manufacturer thereof) by analysis of various documents relating thereto.

As shown, the apparatus 400 comprises a topic scoring component 402 and one or more topic models 404 that operate in conjunction therewith. Likewise, a sentiment scoring component 406 and one or more sentiment models 408 that operate in conjunction therewith are also provided. Both the topic scoring component 402 and the sentiment scoring component 406 are operatively connected to a topic-sentiment scoring component 410 that, in turn, is operatively connected to a credibility determination component 412. In this embodiment, input to the apparatus 400 is provided in the form of one or more target documents 420 for which a credibility determination is to be made. In a further embodiment, as described in more detail below, the credibility determination 414 made by the apparatus based on prior topics discovered in one or more prior documents 430.

The topic scoring component 402 uses the one or more topic models 404 to analyze the documents 420, 430 to discover topics encompassed in one or more documents. More particularly, as described in further detail below, the topic scoring component 402 analyzes portions of the document(s) to discover one or more topics within each portion. Similarly, the sentiment scoring component 406 analyzes each of the portions to determine a sentiment score associated with that portion. In turn, the topic-sentiment scoring component 410 then determines a topic-sentiment score based on the sentiment scores associated with those portions having a detected topic corresponding to a prior topic. Finally, the credibility determination component 412 determines a credibility index 414 based on at least some of the topic-sentiment scores for each of the prior topics. The prior topics, in turn, may be ascertained based on analysis of the prior documents by the topic scoring component 402, or may be provided separately in advance. A more detailed explanation of the apparatus of FIG. 4 is provided with further reference to FIG. 5.

Figure 5:
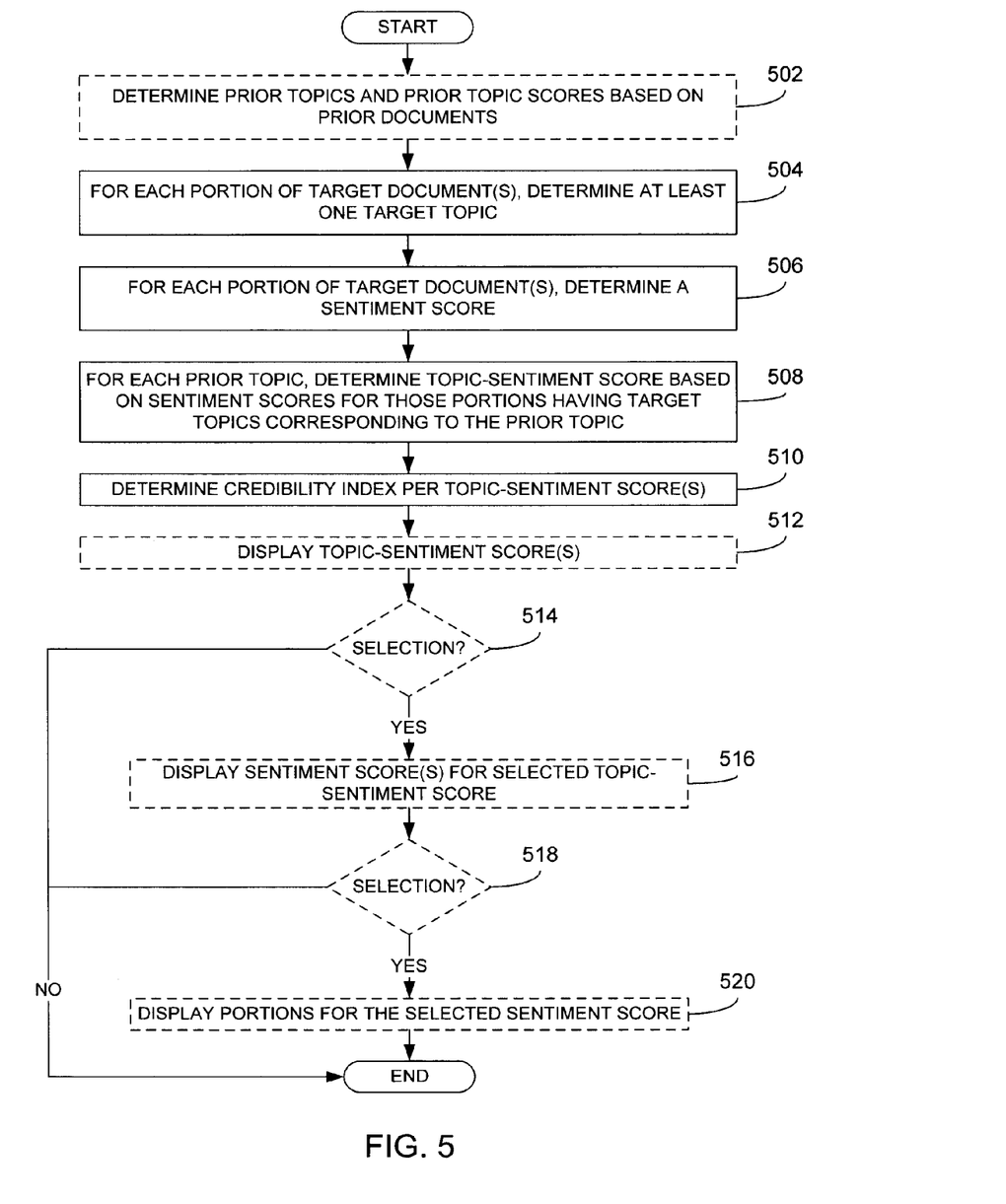
FIG. 5 is a flow chart illustrating processing for determining credibility of a document in accordance with the embodiment of FIG. 4.

Referring now to FIG. 5, operation of the apparatus 400 is described in further detail. Beginning at block 502, a plurality of prior topics and prior topic scores may be optionally determined based on topic model analysis (via the topic scoring component 402) of the one or more prior documents 430. As noted above, the prior topic scores may express the degree of certainty that a given prior topic is expressed in the prior document(s) 430. For example, in the case of a product manufacturer, the prior documents(s) 430 may comprise press releases or the like concerning the product or related products. To further illustrate this, assume that the product in question is an automobile. In this case, the prior topics may include "Reliability", "Comfort", "Exterior", "Interior", "Performance", "Fuel Rating", etc. Alternatively, rather than discovering the plurality of prior topics through analysis of the prior documents 430, the prior topics could simply be provided separately. For example, a subject matter expert or the like may determine what the relevant prior topics and corresponding prior topic scores are.

At block 504, a target topic is determined (via the topic scoring component 402) for each portion of a plurality of portions of the at least one target document 420, thereby providing a plurality of target topics. In an embodiment, the at least one target document 420 may comprise review text or other web-based data that is authored by someone other than the entity for whom credibility is being determined. For example, the at least one target document 420 may comprise review text or other web-based text. Techniques for obtaining such target documents 420, particularly via the Internet and/or World Wide Web, are well known in the art, for example, via the use of one or more web crawlers (sometimes also referred to as web robots or "bots") programmed to visit websites of relevant entities and extract (copy) the desired text.

Furthermore, in an embodiment, each of the plurality of portions comprises an individual sentence within the at least one target document. Techniques for identifying individual sentences, e.g., through the use of punctuation detection, are well-known in the art. It is anticipated, however, that portions may be equally identified according to any other desired criteria. For example, each portion may be delimited according to paragraph or section boundaries, or even as separate documents (in those instances where each target document comprises a relatively small quantity of text). Once again, the instant disclosure is not limited in this regard.

Referring once again to FIG. 5, processing continues at block 506 where, for each of the plurality of portions, a sentiment score is determined via the sentiment scoring component 406. Again, where each portion comprises an individual sentence, then a sentiment for each sentence is determined. It is noted that the topics and sentiments detected for each portion at blocks 505 and 506 may be associated with those portions in the form, for example, of metadata stored along with the actual text itself.

Thereafter, at block 508, for each of the plurality of prior topics (regardless how those prior topics were ascertained), a topic-sentiment score is determined (by the topic-sentiment scoring component 410) based on the sentiments scores for those portions of the plurality of portions have a target topic corresponding to the prior topic. For example, and with further reference to the automobile example noted above, assume a first portion has associated therewith the "Reliability" topic, a second portion has associated therewith the "Interior" topic and a third portion has associated therewith the "Fuel Rating" topic. In that instance where the prior topic is "Interior", only the sentiment for the second portion (and any other portions likewise having a target topic of "Interior") will be considered when developing a topic-sentiment score for that prior topic. In an embodiment, each topic-sentiment score is determined as an average of the sentiment scores associated with the qualifying (i.e., matching) portions. However, it is understood that techniques other than averaging (e.g., weighted averages, selecting a median value, discarding outlier values prior to averaging, etc.) may be equally employed for this purpose.

Having determined the various topic-sentiment scores, processing continues at block 510 where the credibility index 414 is determined (by the credibility determination component 412) based on at least some of the plurality of topic-sentiment scores. In an embodiment, this is done by calculating an average or a weighted average of the topic-sentiment scores in which the prior topic scores are used as the weights. In this manner, the credibility index 414 is most heavily influenced by those prior topics having the greatest likelihood of being encompassed by the prior document(s), i.e., that have been most frequently discussed previously. It is once again noted, however, that the weighted average used to determine the credibility index 414 is not the only technique that may be employed for this purpose; other techniques (e.g., selecting the median valued topic-sentiment score, discarding outliers prior to averaging/weighted averaging, etc.) may serve equally well depending on the desired application.

Figure 6:
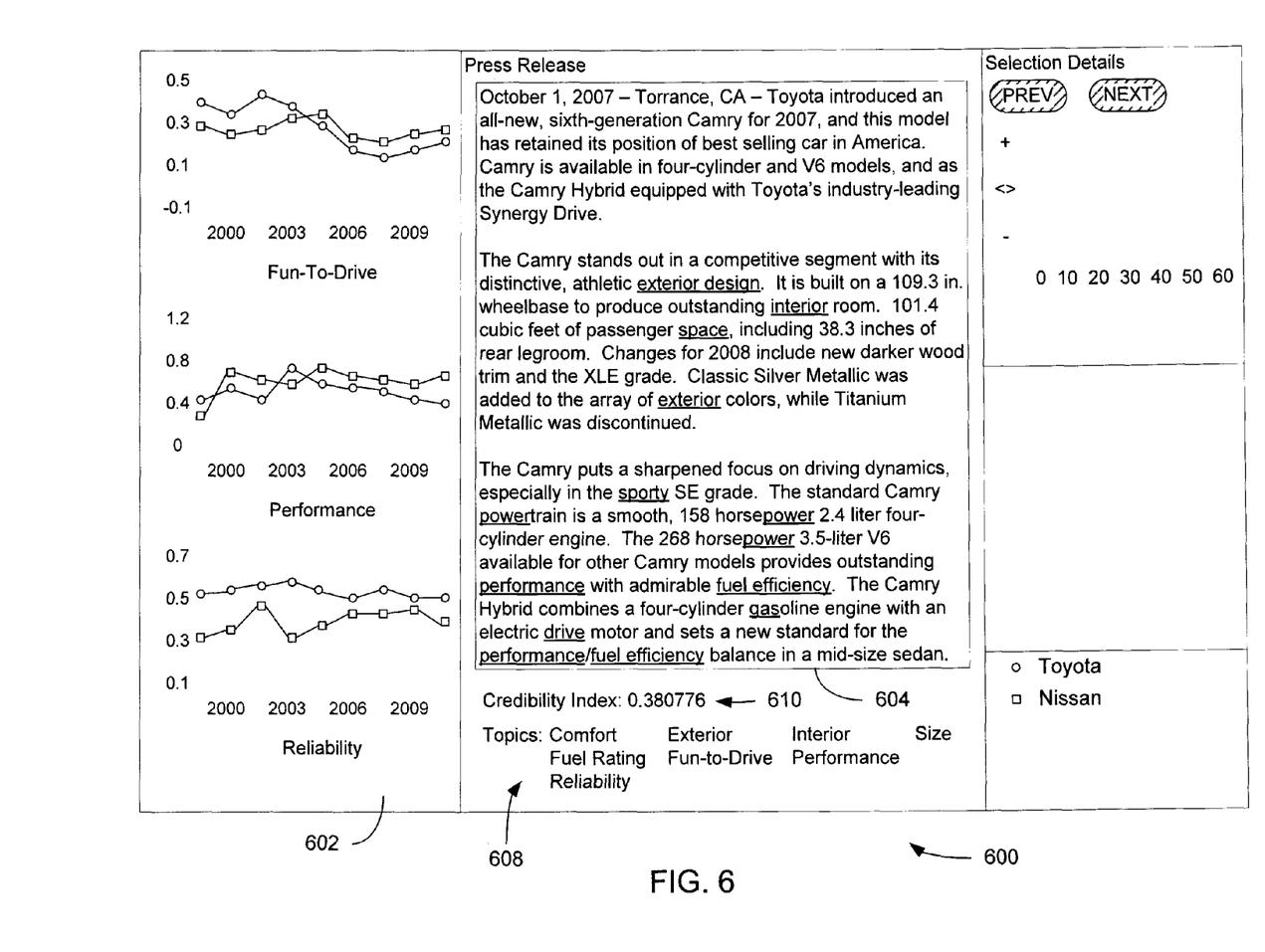
FIGS. 6-8 illustrate examples of a graphical user interface that may be used in conjunction with the various embodiments described herein.

As noted above, the information regarding the topics, sentiments and credibility determinations may be displayed to a user. In FIG. 5, this is illustrated by the optional processing according to blocks 514-520, and as further illustrated by the representative graphical user interfaces shown in FIGS. 6-8. Thus, at block 512, the plurality of topic-sentiment scores may be displayed on a display. An example of this is shown in FIG. 6, which illustrates a graphical user interface 600 comprising a topic-sentiment score region 602, a text display region 604 and a details display region 606. In the illustrated example, the text display region 604 includes a planned communication (prior document) in the form of a press release. Based on the topic discovery processing noted above, a plurality of topics 608 found in the document are also shown and highlighted (via the underlined words in the text display region 604). In an embodiment, each topic 608 may be displayed according to a specific color or other unique highlighting feature, and the corresponding text in the text display region 604 may be similarly highlighted by color, etc.

For each detected topic, a plurality of topic-sentiment scores are displayed in the topic-sentiment score region 602. In the illustrated example, the topic-sentiments scores are grouped according to their corresponding topic (e.g., "Fun-To-Drive", "Performance", "Reliability", etc.) and further displayed as data points in a timeline graph. Furthermore, for comparison purposes, each topic is further divided into subgroups according to any desired data dimension. In this illustrated example, each topic is divided according to two "automobile brands" (shown as "Toyota" and "Nissan") as differentiated by the circular and square data points. Of course, those having ordinary skill in the art will appreciate that more than two different data dimension values may be compared in each graph, and that well-known data mining techniques may be employed to define other data dimensions that may be suitably employed for this purpose. For example, in the automotive example illustrated in FIG. 6, each topic could be further sub-divided according to two or more specific models of cars, by regions, consumer age groups, etc. Once again, techniques for permitting a user to select which particular data dimension they would like to use for comparison purposes are well-known in the art. Within each timeline graph, the topic-sentiment scores corresponding to each specified automobile brand are separated by year, thereby permitting ready comparison of the per topic sentiments meeting the selected display criteria.

Figure 7:
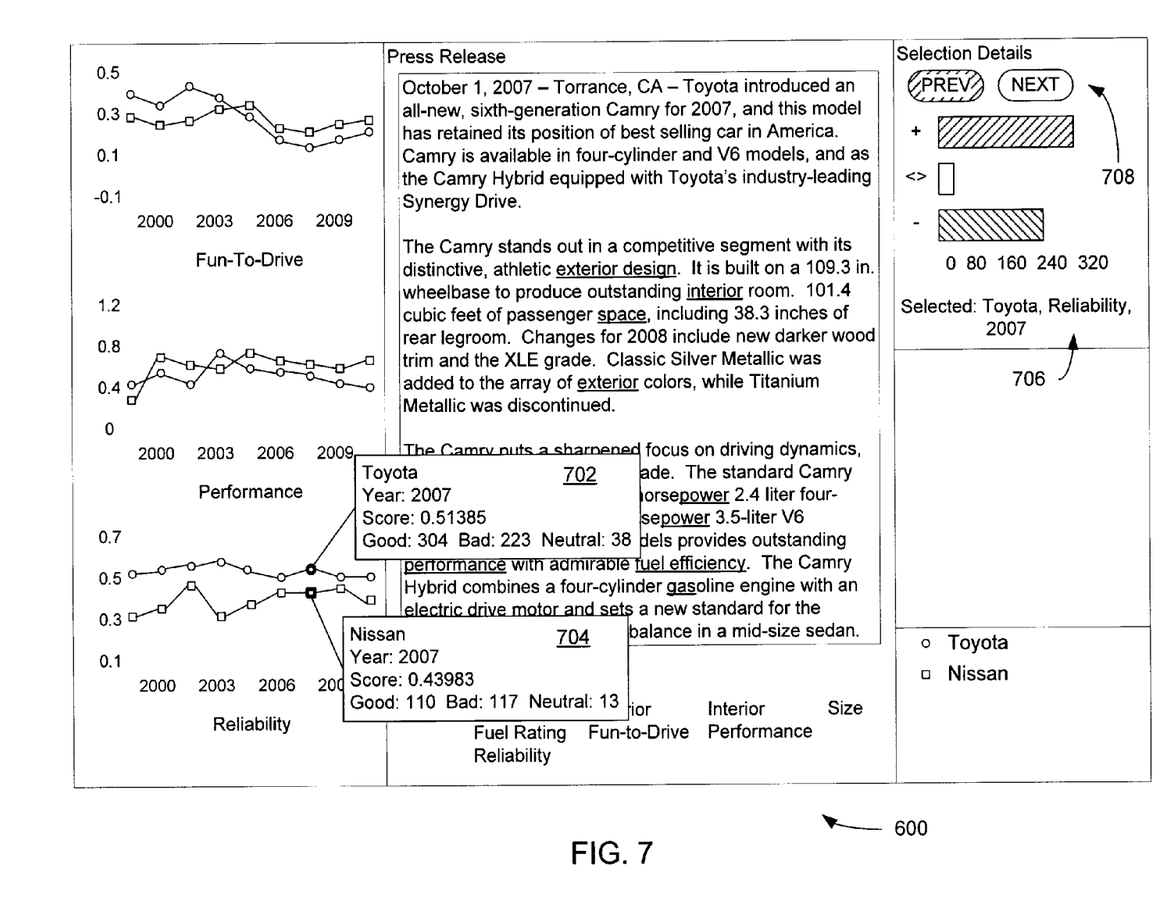
Figure 8:
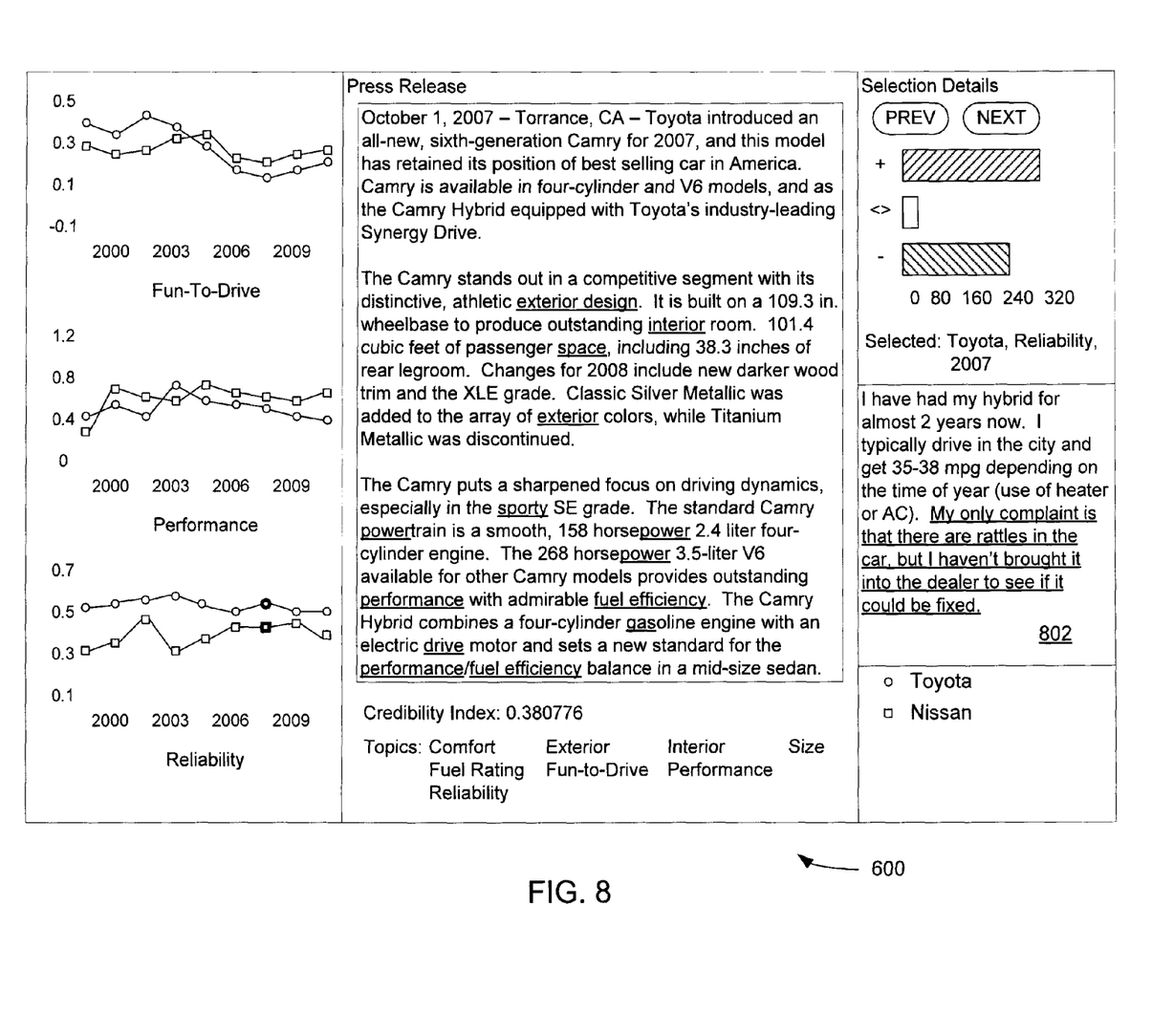

Referring once again to FIG. 5, processing may continue at block 514 where it is determined whether an user input selection of specific topic-sentiment scores has been provided (e.g., received by the processor 102 via, for example, a user input device 106, such as a mouse-cursor combination). If so, processing continues at block 516 where at least one sentiment score underlying the selected topic-sentiment scores is displayed. This is illustrated in FIG. 7 where the graphical user interface 600 has been updated to reflect the selection of the topic-sentiment scores for the year 2007 under the "Reliability" topic. In the illustrated example, the selected topic-sentiment scores are highlighted and related information 702, 704 regarding the sentiment scores for each topic-sentiment score is shown in overlay form. That is, for each of the two topic-sentiment scores, the corresponding year and actual topic-sentiment score is displayed, along with a breakdown of the number of portions (e.g., sentences) found in the at least one target document for each sentiment. The breakdown of portions by sentiment is further illustrated in the details display region 606 in the form of a bar chart 706. In the illustrated example, the breakdown corresponds to the topic-sentiment score for the "Toyota" sub-group within the "Reliability" topic. In this manner, the user is able to better gauge the relative confidence for the selected topic-sentiment score. In addition to the bar chart 706, selection buttons 708 are provided that permit the user to further explore the data underlying the individual sentiment scores.

Referring back once again to FIG. 5, the ability to see the portions underlying the sentiment scores is reflected in block 518 where further user selection input may be provided such that processing continues at block 520 where those portions of the plurality of portions corresponding to a selected sentiment score are displayed. This is reflected in FIG. 8 where selection of either the "Previous" or "Next" selection button 708 causes a portion 802 of the plurality of portions to be displayed in the details display regions 606. In the illustrated embodiment, the text within the portion giving rise to the sentiment can be highlighted (as shown by the underlined text) thereby permitting the user drill all the way down to the specific words used in the target text. Once again, such detailed views are possible because the topic and sentiment metadata is stored along with each portion analyzed as described above.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

In particular, specific examples of the types of communications and documents that may be used in conjunction with the disclosed techniques have been described above. However, it is understood that the disclosed techniques may be applied to a wide variety of different types of communications and documents. For example, the communications and/or documents may be centered around a specific business function such as, by way of non-limiting example, "human resources", "public relations", "recruiting", i.e., the topics may be specialized to the desired business function. In a similar vein, the topics may be selected according to a specialized audience type (e.g., employees, partners, supplier vendors, etc.) or geography (e.g., domestic, international, rural, metropolitan, etc.). Further specialized adaptations leveraging the techniques described herein may be readily devised.

What is claimed is:

1. A non-transitory computer readable medium storing instructions, the instructions comprising:
   one or more instructions that, when executed by at least one processor, cause the at least one processor to:
      identify a plurality of prior topics that are in a plurality of prior documents;
      determine a plurality of target topics in a target document;
      identify one or more portions of the target document that include a target topic, of the plurality of target topics, that corresponds to a prior topic of the plurality of prior topics;
      determine a plurality of sentiment scores based on the one or more portions of the target document that include the target topic that corresponds to the prior topic;
      determine a credibility of the target document based on one or more of the plurality of sentiment scores; and
      perform an action based on the credibility of the target document.

2. The non-transitory computer readable medium of claim 1, where the target document is at least one proposed communication authored by an entity.

3. The non-transitory computer readable medium of claim 1, where the one or more instructions to perform the action comprise:
   one or more instructions that, when executed by the at least one processor, cause the at least one processor to:
      revise the target document based on the credibility of the target document.

4. The non-transitory computer readable medium of claim 1, where the target document is authored by someone other than an entity that is associated with the at least one processor.

5. The non-transitory computer readable medium of claim 4, where the target document is a review of at least one of the entity, a service provided by the entity, or a product provided by the entity.

6. The non-transitory computer readable medium of claim 1, where the one or more instructions to determine the plurality of target topics comprise:
   one or more instructions that, when executed by the at least one processor, cause the at least one processor to:
      determine the plurality of topics by analyzing the target document according to at least one topic model.

7. The non-transitory computer readable medium of claim 1, where the one or more instructions to determine the sentiment scores comprise:
   one or more instructions that, when executed by the at least one processor, cause the at least one processor to:
      determine one or more sentiment scores that correspond to the one or more portions of the target document by analyzing the target document according to at least one sentiment model, and
      determine the plurality of sentiment scores based on the one or more sentiment scores that correspond to the one or more portions of the target document.

8. The non-transitory computer readable medium of claim 1, where the one or more instructions to perform the action comprise:
   one or more instructions that, when executed by the at least one processor, cause the at least one processor to:
      provide, for display, information regarding the credibility of the target document.

9. An apparatus comprising:
   a processor to:
      determine a plurality of prior topics by analyzing a plurality of prior documents;

determine a plurality of target topics encompassed in a target document;

identify one or more portions of the document that encompass a target topic, of the plurality of target topics, that corresponds to a prior topic of the plurality of prior topics;

determine a plurality of sentiment scores based on the one or more portions of the target document that include the target topic that corresponds to the prior topic;

determine a credibility of the target document based on one or more of the plurality of sentiment scores; and perform an action based on the credibility of the target document.

10. The apparatus of claim 9, where, when determining the plurality of prior topics, the processor is to:

determine the plurality of prior topics based on at least one topic model.

11. The apparatus of claim 9, where, when determining the plurality of sentiment scores, the processor is to:

determine one or more sentiments for the one or more portions of the target document based on at least one sentiment model, and determine the plurality of sentiment scores based on the one or more sentiments for the one or more portions of the target document.

12. The apparatus of claim 9, where, when performing the action, the processor is to:

provide, for display, information regarding the credibility of the document.

13. A method comprising:

determining, by a processing device, a plurality of target topics encompassed in a plurality of portions of at least one target document based on at least one topic model;

determining, by the processing device, sentiment scores for the plurality of portions based on at least one sentiment model;

identifying, by the processing device, one or more portions, of the plurality of portions, that encompass a target topic, of the plurality of target topics, that corresponds to a prior topic of a plurality of prior topics, the plurality of prior topics being determined by analyzing prior documents based on the at least one topic model;

identifying, by the processing device, one or more sentiment scores, of the sentiment scores, that correspond to the one or more portions that encompass the target topic;

determining, by the processing device, a plurality of topic-sentiment scores based on the one or more sentiments scores;

determining, by the processing device, a credibility index based on one or more of the plurality of topic-sentiment scores; and performing, by the processing device, an action based on the credibility index.

14. The method of claim 13, where the at least one target document is at least one proposed communication authored by an entity corresponding to the document.

15. The method of claim 13, where performing the action comprises:

revising the at least one target document based on the credibility index.

16. The method of claim 13, where the at least one target document is authored by someone other than an entity corresponding to the document.

17. The method of claim 16, where the at least one target document is a review of at least one of the entity, a service provided by the entity, or a product provided by the entity.

18. The method of claim 13, further comprising:

determining the plurality of prior topics and corresponding prior topic scores by analyzing the prior documents based on the at least one topic model, where determining the credibility index further comprises determining a weighted average of the at least some of the plurality of topic-sentiment scores using, as weights, ones of the plurality of prior topic scores corresponding to the at least some of the plurality of topic-sentiment scores, and determining the credibility index based on the weighted average.

19. The method of claim 13, where the prior documents are authored by an entity that authored the at least one target document.

20. The method of claim 13, wherein each of the plurality of portions comprises a sentence.

21. The method of claim 13, where performing the action comprises:

displaying, via a display, the plurality of topic-sentiment scores.

22. The method of claim 21, further comprising:

displaying, via the display and for a topic-sentiment score of the plurality of topic-sentiment scores, the one or more sentiments scores used to determine the topic-sentiment score.

23. The method of claim 22, further comprising:

displaying, via the display and for a sentiment score of the one or more sentiment scores, a portion of the plurality of portions that corresponds to the sentiment score.

24. An apparatus comprising:

a processor to:

determine a plurality of target topics encompassed in a plurality of portions of at least one target document based on at least one topic model;

determine sentiment scores for the plurality of portions based on at least one sentiment model;

identify one or more portions, of the plurality of portions, that encompass a target topic, of the plurality of target topics, that corresponds to a prior topic of a plurality of prior topics, the plurality of prior topics being determined by analyzing prior documents based on the at least one topic model;

identify one or more sentiment scores, of the sentiment scores, that correspond to the one or more portions that encompass the target topic;

determine a topic-sentiment score, of a plurality of topic-sentiment scores, based on the one or more sentiments scores;

determine a credibility index based on one or more of the plurality of topic-sentiment scores; and perform an action based on the credibility index.

25. The apparatus of claim 24, where the processor is further to:

determine the plurality of prior topics and corresponding prior topic scores by analyzing the prior documents based on the at least one topic model, where, when determining the credibility index, the processor is to:

determine a weighted average of the one or more of the plurality of topic-sentiment scores by using, as weights, ones of the plurality of prior topic scores corresponding to the one or more of the plurality of topic-sentiment scores, and determine the credibility index based on the weighted average.

26. The apparatus of claim 24, further comprising:

a display operatively coupled to the processor,
where the processor is further to:
display, via the display, the plurality of topic-sentiment scores.

27. The apparatus of claim 26, where the processor is further to:

display, via the display, the one or more sentiments scores used to determine the topic-sentiment score.

28. The method of claim 27, where the processor is further to:

display, via the display and for a sentiment score of the one or more sentiment scores, a portion of the plurality of portions that corresponds to the sentiment score.

\* \* \* \* \*